United States Patent

[11] 3,633,927

[72] Inventor Dale A. Van Deven
 Ann Arbor, Mich.
[21] Appl. No. 10,372
[22] Filed Feb. 11, 1970
[45] Patented Jan. 11, 1972
[73] Assignee Federal-Mogul Corporation
 Southfield, Mich.

[54] MOLDED-LIP HYDRODYNAMIC SHAFT SEAL
 8 Claims, 14 Drawing Figs.
[52] U.S. Cl.................................................... 277/134
[51] Int. Cl..................................................... F16j 15/54,
 F16j 9/00
[50] Field of Search............................................ 277/134

[56] References Cited
 UNITED STATES PATENTS
3,501,155 3/1970 Dega et al..................... 277/134 X
3,515,395 6/1970 Weinand....................... 277/134
3,534,969 10/1970 Weinand....................... 277/134 X Primary Examiner—Herbert F. Ross
Attorney—Owen, Wickersham & Erickson ABSTRACT: A molded-lip hydrodynamic shaft seal having a plurality of flutes on the air side of the lip extending at an angle with respect to the lip and each terminating in a cylindrical surface segment having the same inner peripheral diameter as the lip and defining an approach surface meeting the lip edge. The approach surfaces and the lip edge contact the shaft simultaneously when the seal is new, as well as when the seal wears.

PATENTED JAN 11 1972
3,633,927
SHEET 1 OF 4
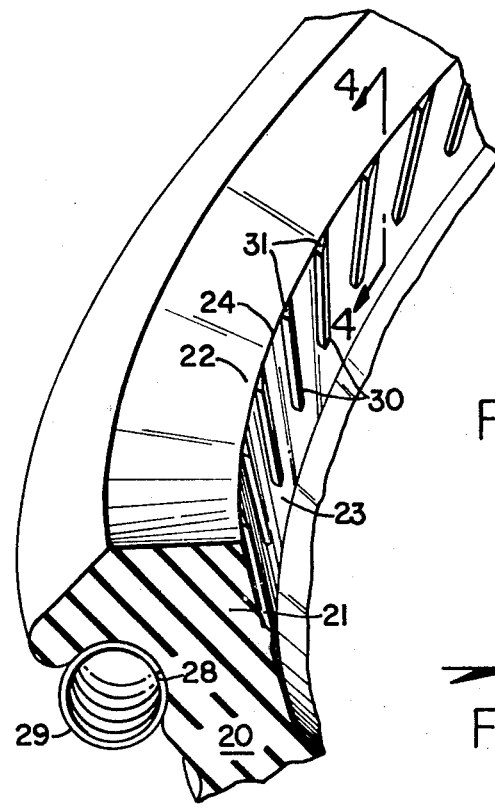
FIG_2
FIG_2A
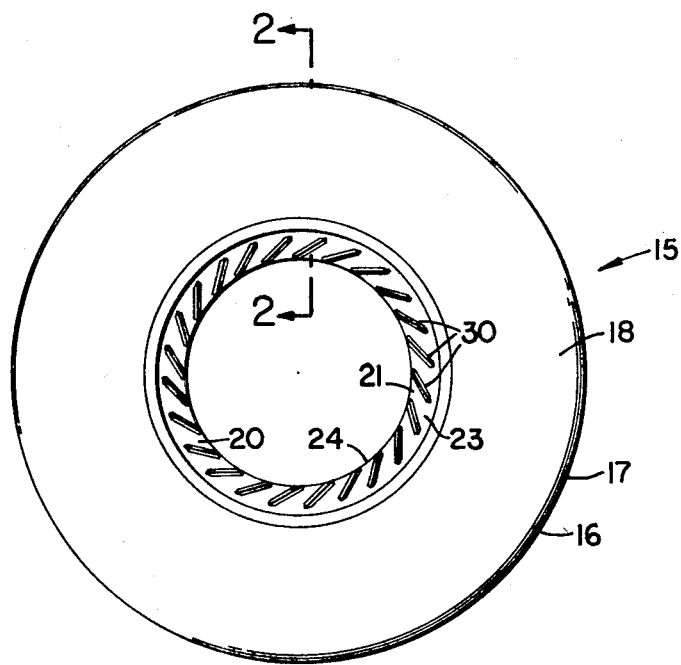
FIG_1
INVENTOR.
DALE A. VAN DEVEN
BY Owen, Wickersham & Erickson
ATTORNEYS

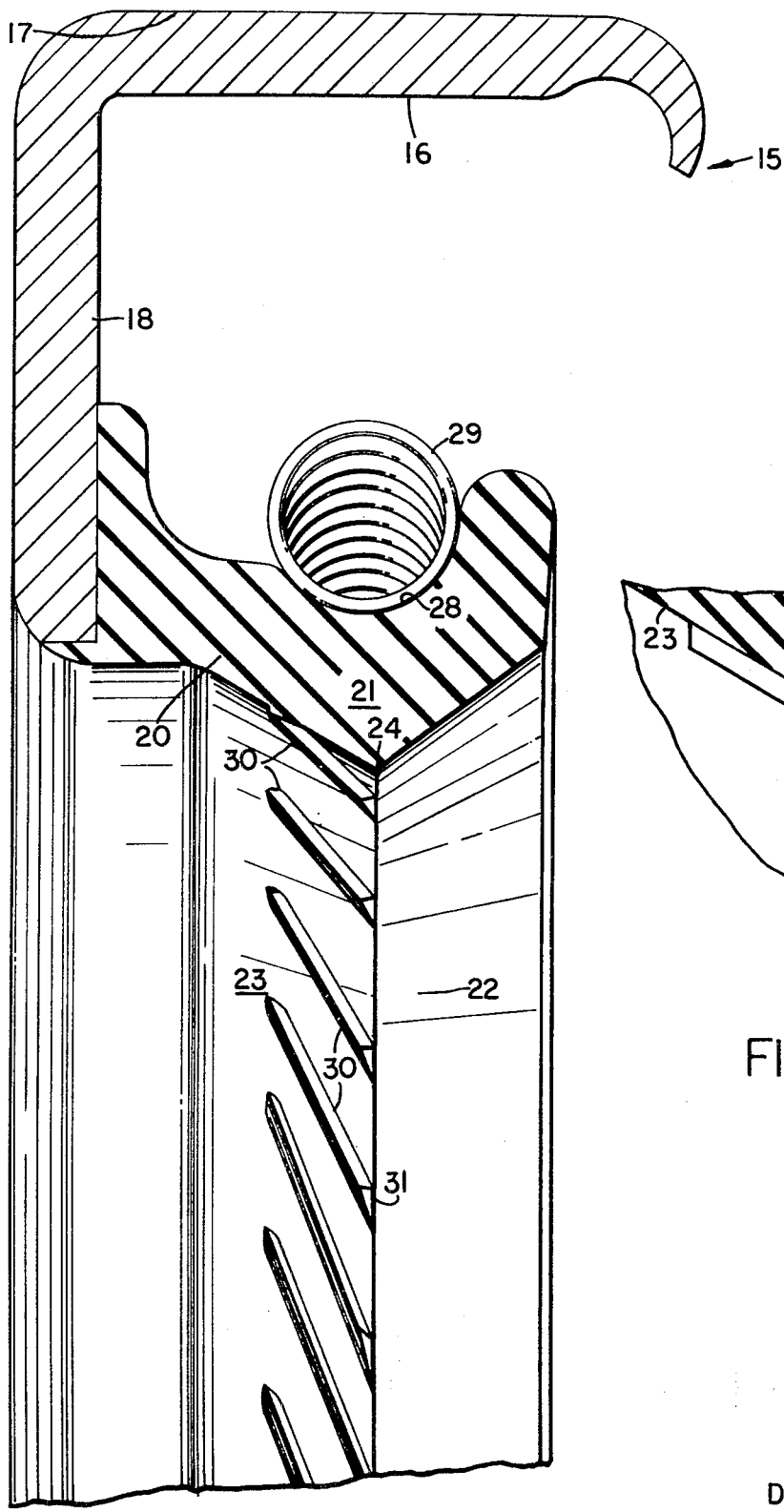
FIG_3
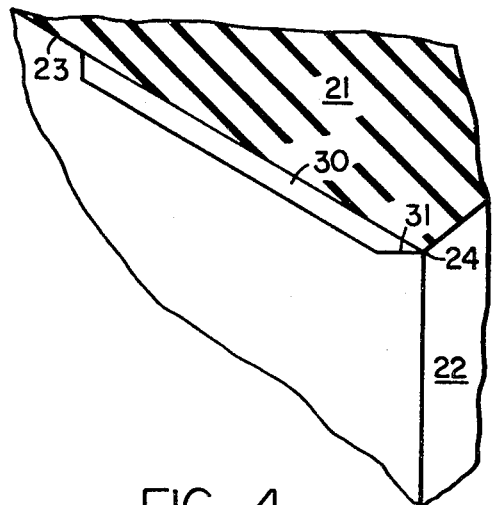
FIG_4

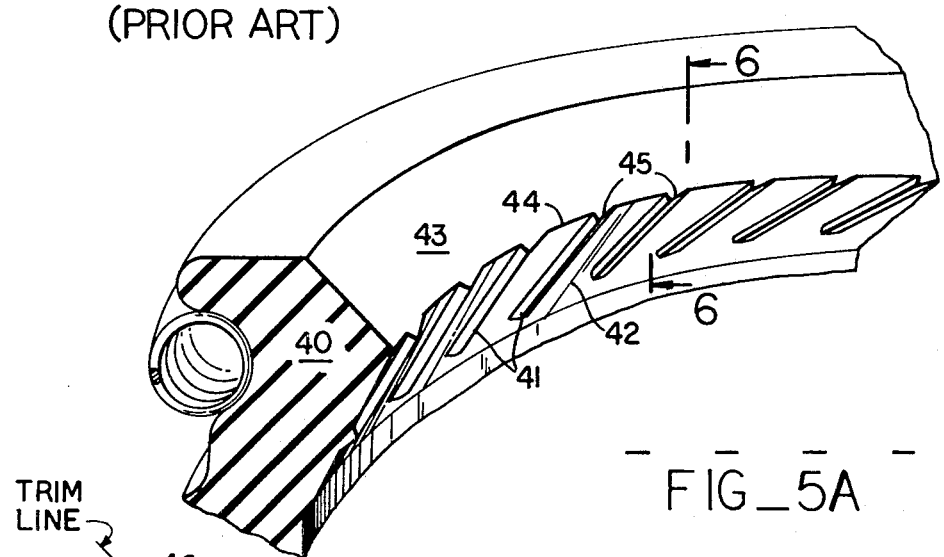
FIG_5 (PRIOR ART)
FIG_5A
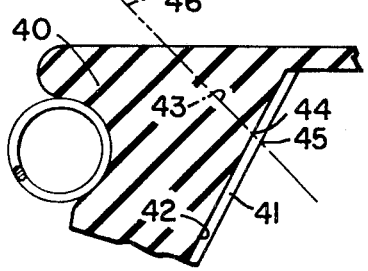
FIG_6
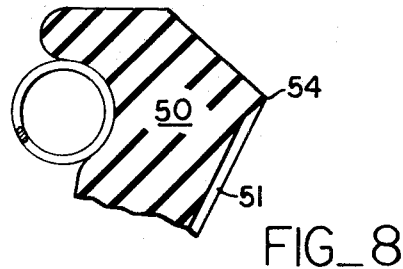
FIG_8
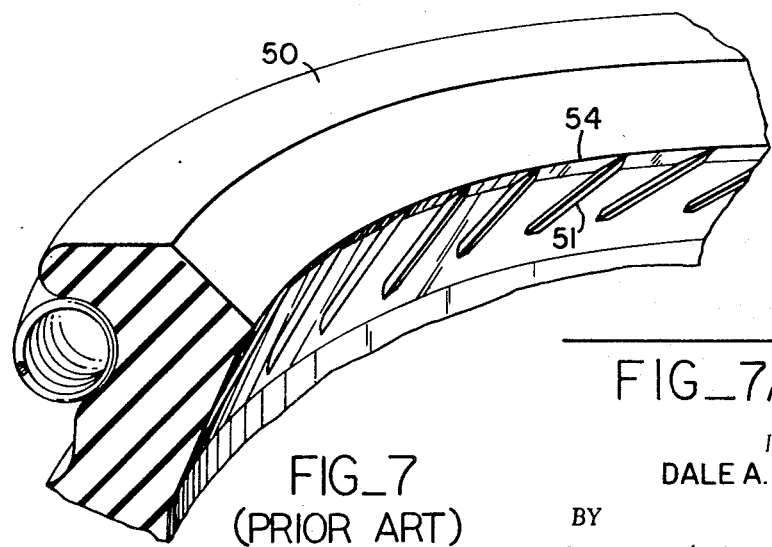
FIG_7 (PRIOR ART)
FIG_7A
INVENTOR.
DALE A. VAN DEVEN
BY
Owen, Wickersham & Erickson
ATTORNEYS

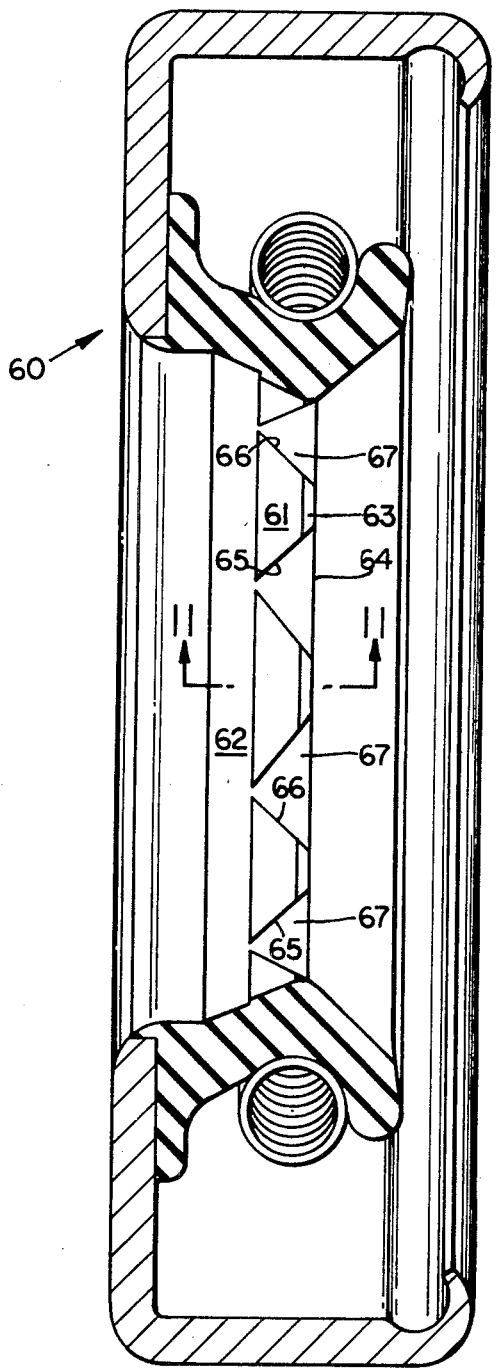
FIG_9
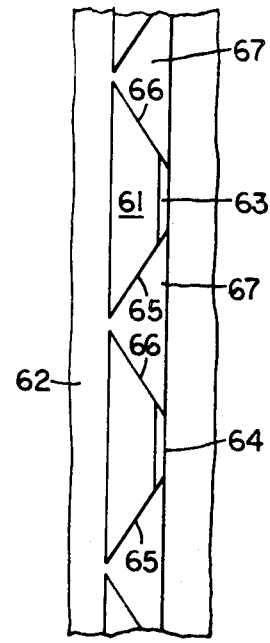
FIG_10
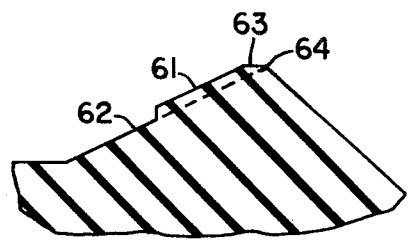
FIG_11
INVENTOR.
DALE A. VAN DEVEN
BY
ATTORNEYS

MOLDED-LIP HYDRODYNAMIC SHAFT SEAL

This invention relates to a molded-lip hydrodynamic shaft seal.

The purpose of hydrodynamic seals is to prevent leakage of oil from between a shaft and housing even though the shaft itself may be marred by defects which ordinarily would enable oil to leak through beneath the lip of the seal during rotation of the shaft. Hydrodynamic seals are of two kinds: one kind is unidirectional and operates so long as the shaft always rotates in the same direction; the other, is bidirectional and returns the oil from the air side of the lip to its oil side no matter which direction the shaft rotates in.

A shaft that has always been handled with care is supposed to be free from scratches and other defects, and, insofar as it is a perfect cylinder, the shaft seal can prevent leakage. However, if the shaft has a deep scratch in it, such that the elastomeric seal lip cannot fill the space in the scratch when the shaft rotates relatively to the lip, the small opening is not sealed by the lip. Under static sealing conditions this may not result in a substantial leak, and as long as the shaft is stationary, the oil may be retained, but when the shaft starts rotating, fluid forces tend to throw the oil along the shaft and under the seal lip; this may differ from ordinary leakage, but it has the same end result, the loss of the lubricant. Hydrodynamic seals endeavor to provide a structure which returns such oil back to the oil side of the lip through hydrodynamic action.

One type of hydrodynamic seal in general use has had a trimmed lip, in which the actual lip edge is formed by cutting off a portion of the molded element to make a sharp sealing edge. When a hydrodynamic seal is so made, the flutes are usually molded on an inclined surface on a wall on the air side of the seal, and the trimming provides an inclined wall that is to be the oil side of the seal. The trimming is done at an angle, such as 45, with the result that the flutes extend in beyond the lip edge, since they lie beyond it. Thus, if inadequate radial force should exist, the contact with the seal lip with the shaft during static conditions is only at the tip of each flute, not with the lip edge, so that in this instance there are many spaces through which the lubricant can leak out. If there is too much radial force, seal wear and shaft wear result in premature failure. Only with the optimum radial force will the flutes be deformed sufficiently to establish a continuous contact with resultant sealing both statically and dynamically and without abnormal wear. The problem is that optimum radial force is difficult or impossible to establish and maintain.

Another type of hydrodynamic seal heretofore known is exemplified by German published patent specification 1,998,343. This seal has a molded lip in which the approach angle of the seal near the contact lip is cut back at a sharper angle than the remainder of the approach surface. The flutes blend in with this sharper angle, and as a result do not touch the shaft when the seal is installed. The lip edge does touch the shaft around its full periphery, so that the seal does not ordinarily leak statically. However, the seal is not hydrodynamic when it is new. Only after some wear do the flutes begin to touch the shaft; therefore, the hydrodynamic action is delayed and may take place only after a seal has run several hundred hours.

The present invention is a molded lip seal in which the flutes are provided with surfaces that are essentially cylindrical segments at the same radius from the axis of the shaft as the lip edge, so that both the approach surface between the flutes and the lip edge contact the shaft simultaneously when the seal is new, and they continue to do so as the seal wears. The invention also applies to the bidirectional seals with triangles, instead of helical flutes, as will be seen.

In the drawings:

FIG. 1 is an end view of a hydrodynamic shaft seal embodying the principles of the invention.

FIG. 2 is an enlarged fragmentary view in perspective and in section of a portion of the seal of FIG. 1, taken along the line 2—2 in FIG. 1.

FIG. 2A is a view of the contact pattern which the seal of FIG. 2 makes with the shaft.

FIG. 3 is a still further enlarged view in section taken along the line 2—2 in FIG. 1.

FIG. 4 is a view in section taken along the line 4—4 in FIG. 2.

FIG. 5 is a view similar to FIG. 2 of a prior art type of trimmed lip seal, after the trimming.

FIG. 5A is a view like FIG. 2A of the contact pattern which the seal of FIG. 5 makes with the shaft.

FIG. 6 is a view taken along the line 6—6 in FIG. 5, but with the seal shown before trimming.

FIG. 7 is a view like FIG. 2 of another prior art seal, having a molded lip.

FIG. 7A is a view like FIG. 2A of the contact pattern which the seal of FIG. 7 makes with the shaft.

FIG. 8 is a view like FIG. 4 of the seal of FIG. 7.

FIG. 9 is a view in elevation and in section of a bidirectional seal embodying the principles of the invention.

FIG. 10 is a fragmentary view of a portion of the seal of FIG. 9.

FIG. 11 is a view taken along the line 11—11 in FIG. 9.

A complete oil seal according to the present invention may comprise a variety of structures with the basic similarity appearing only in the lip structure. By way of example, FIGS. 1 and 3 show a seal 15 having a rigid metal case 16 with a cylindrical bore-engaging surface 17 and a radial flange 18. Along the inner periphery of the seal 15, the case 16 supports an elastomeric body 20 having a lip 21 formed, in this instance, by an as-molded surface having an inclined wall 22 on the oil side of the lip 21 meeting an inclined portion 23 on the air side thereof. The meeting provides a lip edge 24. Opposite the lip edge 24 there may be a groove 28 in which is seated a garter spring 29. This spring 29 is not always necessary but is usually desirable.

In this invention a series of flutes 30 is molded on the inclined air sidewall portion 23 and project out therefrom, preferably about 0.002" to 0.006". They are spaced apart, preferably evenly to the nearest even degree at about 0.025" to 0.075", on center or peak to peak, and they extend at an angle relative to the lip edge 24 to enable their hydrodynamic action; this angle may, for example, be about 10° to 45°, preferably about 20°. As shown in FIGS. 3 and 4, a foot portion 31 of each flute 30 is a short cylindrical surface segment having the same radius as the lip edge 24. Since these feet 31 lie at exactly the same radial distance from the center of the shaft as does the lip, when the seal 15 is installed, the interference of the lip 21 with the shaft will be the interference of the flute feet 31 and the lip edge 24, which are substantially identical. Note the contact pattern which the seal makes with the shaft, shown in FIG. 2A. Hence, the seal 15 seals both statically and dynamically and returns oil to the oil side of the lip edge 24 if oil should get beyond it and between any two successive flutes 30. Hydrodynamic action is already well known and need not be described in detail here. The point is that the seal 15 provides both a static seal and a hydrodynamic seal, both when the seal is new and when it has worn.

In contrast, two prior art seals are illustrated in FIGS. 5–8, to help to define the invention more clearly. In a trimmed seal 40 (FIGS. 5 and 6) molded flutes 41 project out from an inclined surface 42. The surface 42 meets a trimmed inclined surface 43 to form a lip edge 44, but the flutes 41 extend to edges 45 well beyond the lip edge 44. This is unavoidable, because nobody knows precisely where the trim will be, and the trim line 46, shown in FIG. 6, crosses the inclined portion 42 to define the lip edge 44, but at each flute 41, it extends somewhat beyond it and closer to the shaft. Unless sufficient radial force can be applied by the garter spring, the seal 40 is held away from the shaft in between the flutes 41 and can leak when the seal 40 is in a static condition. Note the contact pattern of FIG. 5A showing the interruptions. When the flutes 41 wear, eventually the seal 40 will seal statically as well as dynamically. But the point here is that one cannot rely on its being able to seal statically when it is new.

Similarly, a prior art molded-lip seal 50 is shown in FIGS. 7 and 8. There, flutes 51 meet a lip edge 54 sharply and lie radially out therefrom at all points. Hence, until the seal lip edge 54 is gradually worn off by use, there is no hydrodynamic action. Note the seal-shaft contact pattern shown in FIG. 7A. The hydrodynamic action develops after the seal wears, but the point here is that there is no hydrodynamic action when the seal is new.

The contrast in action between the seal of FIG. 1 to 4 of the present invention and of the two prior art seals of FIG. 5-8 is clearly shown in a comparison of FIGS. 2A, 5A and 7A.

FIGS. 9-11 show the invention applied to a bidirectional seal 60 in which triangular portions 61 are molded to project out from the air side lip wall 62. These triangular portions also have a bottom pad 63 which lies exactly the same radial distance from the shaft as does the lip edge 64, so that, once again, the hydrodynamic action is obtained from the beginning and a static seal is also obtained from the beginning. In one direction of shaft rotation, the hydrodynamic action is obtained by the triangles' sides 65; in the other direction of shaft rotation, the hydrodynamic action is obtained by the triangles' sides 66, both with the cooperation of the triangular grooves 67 that lie in between the triangles 61 and are inverted with respect to them.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A molded-lip hydrodynamic type of radial shaft seal, comprising an annular lip having a generally frustoconical air sidewall and a generally frustoconical oil sidewall converging to a sharp circular lip edge, a plurality of flutes molded integrally to and forming part of said air sidewall and projecting outwardly therefrom and extending at an angle relative to said lip edge, and said flutes coinciding with said lip edge at one end and terminating at said lip edge in a cylindrical surface segment lying when newly molded and undeformed at the same radius from the axis of the seal as said lip edge, s that said cylindrical surface segments are adapted to contact a shaft surface immediately and thus provide both static and dynamic sealing without initial run-in wear.

2. The seal of claim 1 wherein said flutes are helical segments.

3. The seal of claim 1 wherein said flutes comprise a series of generally triangular pads with their vertices at said lip edge and at the same radius from the seal axis.

4. The seal of claim 3 wherein each said generally triangular pad touches two other triangular pads along a line distant from said lip edge, so that there are inverted triangular grooves between adjacent pads.

5. The seal of claim 1 wherein said flutes meet said lip edge at about 10° to 45°.

6. The seal of claim 5 wherein the flutes meet the lip edge at about 20°.

7. The seal of claim 1 wherein the flutes are spaced apart, on center, about 0.025" to 0.075".

8. The seal of claim 1 wherein the flute height above the air side wall is about 0.002" and 0.006".

* * * * *